(12) United States Patent
St. Clair

(10) Patent No.: US 7,994,256 B2
(45) Date of Patent: Aug. 9, 2011

(54) GEL COMPOSITIONS

(75) Inventor: David J. St. Clair, Houston, TX (US)

(73) Assignee: Kraton Polymers U.S. LLC, Houston, TX (US)

( * ) Notice: Subject to any disclaimer, the term of this patent is extended or adjusted under 35 U.S.C. 154(b) by 386 days.

(21) Appl. No.: 12/353,438

(22) Filed: Jan. 14, 2009

(65) Prior Publication Data

US 2009/0186958 A1     Jul. 23, 2009

Related U.S. Application Data

(60) Provisional application No. 61/021,991, filed on Jan. 18, 2008.

(51) Int. Cl.
*C08K 5/00* (2006.01)
*C08L 9/06* (2006.01)
*C08L 53/02* (2006.01)

(52) U.S. Cl. ........ 525/232; 525/240; 524/575; 524/322; 524/321; 524/284; 524/296; 524/474; 524/314

(58) Field of Classification Search ........... 525/232, 525/240; 524/575, 322, 321, 284, 296, 474, 524/314
See application file for complete search history.

(56) References Cited

U.S. PATENT DOCUMENTS

| | | | |
|---|---|---|---|
| 3,494,942 A | 2/1970 | Takuichi et al. | |
| RE27,145 E | 6/1971 | Jones | |
| 3,634,549 A | 1/1972 | Shaw et al. | |
| 3,670,054 A | 6/1972 | De La Mare et al. | |
| 3,700,633 A | 10/1972 | Wald et al. | |
| 3,985,830 A | 10/1976 | Fetters et al. | |
| 4,286,077 A * | 8/1981 | St. Clair et al. | 524/505 |
| 4,391,949 A | 7/1983 | St. Clair | |
| 4,444,953 A | 4/1984 | St. Clair | |
| 5,668,209 A * | 9/1997 | Ruch et al. | 524/555 |
| 5,837,769 A * | 11/1998 | Graafland et al. | 524/505 |
| 5,900,445 A | 5/1999 | Chandler et al. | |
| 5,900,455 A * | 5/1999 | Breuer et al. | 524/575 |
| 6,492,469 B2 | 12/2002 | Willis et al. | |
| 6,653,408 B1 | 11/2003 | St. Clair | |
| 6,881,776 B2 | 4/2005 | Butuc | |
| 7,037,976 B2 | 5/2006 | Maris et al. | |
| 7,157,521 B2 * | 1/2007 | Wang et al. | 525/232 |
| 7,297,741 B2 * | 11/2007 | St. Clair et al. | 524/505 |
| 2004/0138371 A1 | 7/2004 | St. Clair | |
| 2005/0013996 A1 * | 1/2005 | Hatfield | 428/355 BL |
| 2005/0215725 A1 * | 9/2005 | St. Clair | 525/314 |
| 2006/0205849 A1 | 9/2006 | St. Clair | |
| 2007/0078194 A1 * | 4/2007 | St. Clair | 522/6 |
| 2007/0078205 A1 | 4/2007 | St.Clair | |
| 2007/0105658 A1 | 5/2007 | Hebert et al. | |

FOREIGN PATENT DOCUMENTS

CA    0716645    8/1965

* cited by examiner

*Primary Examiner* — Sanza L McClendon
(74) *Attorney, Agent, or Firm* — Michael A. Masse

(57) ABSTRACT

Disclosed are four gel compositions that have improved properties over the prior art. These gels include elastosols, solid rubbery gels, UV cured gels and chemically cured gels. The gels are formed from selectively hydrogenated styrene/diene block copolymers, unhydrogenated styrene/diene block copolymers, and selectively hydrogenated styrene/diene block copolymers that have been maleated.

6 Claims, No Drawings

GEL COMPOSITIONS

BACKGROUND OF THE INVENTION

1. Field of the Invention

The present invention relates broadly to gel compositions. The present invention particularly relates to elastosols, solid rubbery gels, UV curable gels and chemically curable gels.

2. Background of the Art

Gel compositions are well known in the art and are known to be useful in making many types of products. For the purposes of the present invention, a gel is a solid and rubbery material. Gels are useful for preparing articles such as clear oil gel candles, when combined with oil, or air fresheners, when combined with a volatile solvent and a fragrance. Other applications of such gels are the formation of soft articles such as gaskets, cushions and toys.

While gels are well known, there continues to be discovered new applications and corresponding new requirements for gels. This has led to a significant increase in the need to improve gel properties, and hence, has led to new opportunities for novel gel compositions. For example, in U.S. Pat. No. 6,881,776, two-phase gel compositions are shown. However, the resulting gels are generally too soft or even liquid in some cases, which may be useful for some applications but not for all applications. What would be needed for some applications would be solid rubbery gels. In another example, U.S. Pat. No. 5,900,445 teaches a method for preparing elastosols. However, the elastosols of the '445 patent do not have the necessary properties at high temperature that are needed for certain applications such as sealants that will stay in place in automotive paint baking ovens. Likewise, certain UV cured and chemically cured gels are known, yet improvement needs to be made in the way the gels are prepared.

New gel compositions are required to meet the ever changing and ever demanding applications that are being developed. The present invention addresses some of those applications, by proposing new compositions and methods for making such compositions.

SUMMARY OF THE INVENTION

In one aspect, the present invention is a method for preparing an elastosol, comprising the steps of:

(a) mixing 5 to 50 parts by weight of a block copolymer and 95 to 50 parts by weight of a benzoate ester having a melting point between about 70° C. and about 170° C. and mixing at a temperature above the melting point of the ester, wherein said block copolymer is a solid selectively hydrogenated block copolymer having the general configuration A-B-A, $(A-C)_nX$ or mixtures thereof, where n is an integer from 2 to about 4, and X is coupling agent residue, and wherein:

(i) prior to hydrogenation each A block is a mono alkenyl arene polymer block and each B block and C block is a conjugated diene block having a vinyl content between 30 weight percent and 70 weight percent;

(ii) subsequent to hydrogenation about 0-10% of the arene double bonds have been reduced, and at least about 90% of the conjugated diene double bonds have been reduced;

(iii) each A block having a number average molecular weight between about 25,000 and about 35,000; each B block having a number average molecular weight between about 100,000 and about 150,000; and each C block having a number average molecular weight between about 50,000 and about 75,000;

(iv) the total amount of mono alkenyl arene in the hydrogenated block copolymer is about 30 percent weight to about 35 percent weight;

(b) cooling the block copolymer/benzoate ester mixture below the melting point of the ester and turning it into a powder having a particle size of less than 800 micron;

(c) mixing the block copolymer/benzoate ester powder with an oil and a tackifying resin at room temperature to form a dispersion wherein the percent weight of the block copolymer/benzoate ester powder mixture is between 15 and 50 wt. %, the weight percent of oil is between zero and 30 wt. %, and the weight percent of tackifying resin is between 85 and 30 wt. %;

(d) heating the dispersion of the block copolymer/benzoate ester powder to a temperature higher than the melting point of the ester to form a hot fluid mixture; and (e) cooling the fluid mixture to form a solid elastic composition.

The elastosols prepared by the present invention can be handled as a paste at ambient temperatures which fuses to become a coherent, elastic composition afterfusing at high temperature. These compositions have utility as heat fusible sealants and caulks as well as elastomeric coatings.

In another aspect, the present invention is a method of forming a solid gel comprising the steps of:

(a) mixing about 5 to about 20 parts by weight of a block copolymer with 95 to 80 parts by weight of an ester compound at elevated temperature to form a hot fluid blend, wherein said block copolymer is a solid selectively hydrogenated block copolymer having the general configuration A-B-A, $(A-C)_nX$ or mixtures thereof, where n is an integer from 2 to about 4, and X is coupling agent residue, and wherein:

(i) prior to hydrogenation each A block is a mono alkenyl arene polymer block and each B block and C block is a conjugated diene block having a vinyl content between 30 weight percent and 50 weight percent;

(ii) subsequent to hydrogenation about 0-10% of the arene double bonds have been reduced, and at least about 90% of the conjugated diene double bonds have been reduced;

(iii) each A block having a number average molecular weight between about 25,000 and about 45,000; each B block having a number average molecular weight between about 100,000 and about 200,000; and each C block having a number average molecular weight between about 50,000 and about 100,000;

(iv) the total amount of mono alkenyl arene in the hydrogenated block copolymer is about 30 percent weight to about 35 percent weight;

(b) cooling said hot fluid blend to room temperature to form a cooled masterbatch; and (c) mixing said cooled masterbatch with an extending oil in a ratio of masterbatch to oil of 60:40 to 40:60, therein forming a solid, rubbery gel.

The gels formed by the method claimed are solid, rubbery gels which can be used in a wide variety of applications ranging from cable filling compounds to air fresheners. They are unique in that solid, rubbery gels are usually made by dissolving the block copolymer directly in the oil at high temperature and the blend becomes a rubbery solid as the gel cools. In contrast, the gels of this invention are made at ambient temperature by mixing the masterbatch with the oil to form the solid rubbery gel.

In yet another aspect, the present invention is a method of forming a gel composition that may be crosslinked by exposure to radiation comprising:

(a) mixing about 5 to 20 parts by weight percent of an unhydrogenated crosslinkable block copolymer with 95 to 80 parts by weight of an ester compound at elevated temperature to form a hot fluid blend, wherein said block copolymer has the general configuration A-B-A or $(A-C)_nX$ and (A-C) where n is an integer from 2 to 4, X is coupling agent residue, and the weight ratio of $(A-C)_nX$ to (A-C) is between 75:25 and 90:10, and wherein:
  (i) each A block is a mono alkenyl arene polymer block and each C block and B block is a conjugated diene block having a vinyl content between 10 weight percent and 70 weight percent;
  (ii) each A block having a number average molecular weight between about 15,000 and about 25,000; each C block having a number average molecular weight between about 40,000 and about 80,000; and each B block having a number average molecular weight between about 80,000 and 160,000
  (iii) the total amount of mono alkenyl arene in the block copolymer is about 30 percent weight to about 35 percent weight;
(b) cooling said hot fluid blend to room temperature to form a cooled masterbatch;
(c) mixing said cooled masterbatch with
  (i) from 40 to 60 weight percent of a liquid component selected from the group consisting of extending oils, resins and solvents which are compatible with the crosslinkable block copolymer;
  (ii) from 0 to 20 weight percent of at least one crosslinker selected from the group consisting of difunctional or multifunctional acrylate or methacrylate monomers and vinyl ethers;
  (iii) optionally from 0 to 5 weight percent expandable microspheres and/or chemical blowing agent; and
  (iv) from 0.1 to 3 weight percent of a photoinitiator wherein the total of all components equals 100 weight percent, therein forming a solid, rubbery gel wherein said weight percent is based on the total gel composition; and
(d) crosslinking the resulting gel by exposure to UV radiation.

The UV cured gels of the present invention show improvements over prior UV cured gels in that the gels can be prepared at ambient temperature. This allows the expandable microspheres and/or chemical blowing agent to be incorporated at a temperature well below their activation temperature, simplifying the mixing process.

In still another aspect, the present invention is a process for making a thermoplastic gel composition that may be chemically crosslinked comprising:

(a) mixing about 5 to about 20 parts by weight of a maleated block copolymer with 95 to 80 parts by weight of an ester at elevated temperature to form a hot fluid blend, wherein said block copolymer is a maleated, selectively hydrogenated block copolymer having the general configuration A-B-A, $(A-C)_nX$ or mixtures thereof, where n is an integer from 2 to about 4, and X is coupling agent residue, and wherein:
  (i) prior to hydrogenation each A block is a mono alkenyl arene polymer block and each B and C block is a conjugated diene block having a vinyl content between 30 weight percent and 70 weight percent;
  (ii) subsequent to hydrogenation about 0-10% of the arene double bonds have been reduced, and at least about 90% of the conjugated diene double bonds have been reduced;
  (iii) each A block having a number average molecular weight between about 25,000 and about 45,000; each B block having a number average molecular weight between about 100,000 and about 200,000; and each C block having a number average molecular weight between about 50,000 and about 100,000;
  (iv) the block copolymer after hydrogenation having been grafted with an acid compound selected from the group consisting of maleic anhydride, maleic acid, fumaric acid, and their derivatives; and
  (v) the total amount of mono alkenyl arene in the hydrogenated block copolymer is about 25 percent weight to about 35 percent weight;
(b) mixing between 40 and 60 parts by weight of the blend of step (a) with 0.1 to 5 parts by weight of a chemical crosslinking agent capable of reacting with the acid/anhydride functional groups, 60 to 40 parts by weight of a liquid component selected from the group consisting of extending oils, resins and solvents which are compatible with the maleated block copolymer, zero to 10 parts by weight of a chemical foaming agent and zero to 10 parts by weight of expandable microspheres; and
(c) chemically curing the mixture of step (b) to form a solid, rubbery gel.

The chemically cured gels of the present invention show distinct improvements over the prior art in that the gels can be prepared at ambient temperature. This allows the chemical foaming agent or expandable microspheres to be incorporated at a temperature well below their activation temperature, thereby simplifying the process for making the gel.

The present invention comprises gel compositions having improved processability over the prior art. What has been shown is that the block copolymer employed in the gel is very important in achieving the property advantages required.

DETAILED DESCRIPTION OF THE PREFERRED EMBODIMENTS

Elastosols

One aspect of the present invention relates to elastosols. As related to elastosols, the invention comprises a method for preparing an elastosol, comprising the steps of:

(a) mixing 5 to 50 parts by weight of a block copolymer and 95 to 50 parts by weight of a benzoate ester having a melting point between about 700° C. and about 1700° C. and mixing at a temperature above the melting point of the ester, wherein said block copolymer is a solid selectively hydrogenated block copolymer having the general configuration A-B-A, $(A-C)_nX$ or mixtures thereof, where n is an integer from 2 to about 4, and X is coupling agent residue, and wherein:
  (i) prior to hydrogenation each A block is a mono alkenyl arene polymer block and each B block and C block is a conjugated diene block having a vinyl content between 30 weight percent and 70 weight percent;
  (ii) subsequent to hydrogenation about 0-10% of the arene double bonds have been reduced, and at least about 90% of the conjugated diene double bonds have been reduced;
  (iii) each A block having a number average molecular weight between about 25,000 and about 35,000; each B block having a number average molecular weight between about 100,000 and about 150,000; and each C block having a number average molecular weight between about 50,000 and about 75,000;
  (iv) the total amount of mono alkenyl arene in the hydrogenated block copolymer is about 30 percent weight to about 35 percent weight;
(b) cooling the block copolymer/benzoate ester mixture below the melting point of the ester and turning it into a powder having a particle size of less than 800 micron;

(c) mixing the block copolymer/benzoate ester powder with an oil and a tackifying resin at room temperature to form a dispersion wherein the percent weight of the block copolymer/benzoate ester powder mixture is between 15 and 50 wt. %, the weight percent of oil is between zero and 30 wt. %, and the weight percent of tackifying resin is between 85 and 30 wt. %;

(d) heating the dispersion of the block copolymer/benzoate ester powder to a temperature higher than the melting point of the ester to form a hot fluid mixture; and (e) cooling the fluid mixture to form a solid elastic composition.

An elastosol comprises dispersions of very fine elastomeric block copolymer and resin in liquid organic media. The gel like substance is typically spread on the part or surface. Then the part or surface is heated to elevated temperature in order to melt the solid ester, allowing the oil and resin to form an intimate mixture with the polymer. Upon cooling to room temperature, the composition is a coherent, fused, elastic solid. These compositions could be used as sealants or caulks which fuse in an automotive paint baking oven to become an tough, elastic hole filler.

The selection of the block copolymer and the benzoate ester are important in achieving the desired properties. The block copolymer is a selectively hydrogenated monoalkenyl arene/conjugated diene block copolymer of the structure A-B-A or $(A-C)_nX$. Starting materials for preparing the novel copolymers of the present invention include the initial monomers. The monomers used for A blocks are alkenyl arenes selected from styrene, alpha-methylstyrene, para-methylstyrene, vinyl toluene, vinylnaphthalene, and para-butyl styrene or mixtures thereof. Of these, styrene is most preferred and is commercially available, and relatively inexpensive, from a variety of manufacturers. The monomers used for B and C blocks are conjugated dienes such as 1,3-butadiene and substituted butadienes such as isoprene, piperylene, 2,3-dimethyl-1,3-butadiene, and 1-phenyl-1,3-butadiene, or mixtures thereof. Of these, 1,3-butadiene is most preferred. As used herein, and in the claims, "butadiene" refers specifically to "1,3-butadiene".

With regard to the process to prepare the polymers, the anionic polymerization process comprises polymerizing the suitable monomers in solution with a lithium initiator. The solvent used as the polymerization vehicle may be any hydrocarbon that does not react with the living anionic chain end of the forming polymer, is easily handled in commercial polymerization units, and offers the appropriate solubility characteristics for the product polymer. For example, non-polar aliphatic hydrocarbons, which are generally lacking in ionizable hydrogen atoms make particularly suitable solvents. Frequently used are cyclic alkanes, such as cyclopentane, cyclohexane, cycloheptane, and cyclooctane, all of which are relatively non-polar. Other suitable solvents will be known to those skilled in the art and can be selected to perform effectively in a given set of process conditions, with polymerization temperature being one of the major factors taken into consideration.

Starting materials for preparing the block copolymers of the present invention include the initial monomers noted above. Other important starting materials for anionic polymerization include one or more polymerization initiators. In the present invention such include, for example, alkyl lithium compounds such as s-butyllithium, n-butyllithium, t-butyllithium, amyllithium and the like and other organo lithium compounds including di-initiators such as the di-sec-butyl lithium adduct of m-diisopropenyl benzene. Other such di-initiators are disclosed in U.S. Pat. No. 6,492,469, each incorporated herein by reference. Of the various polymerization initiators, s-butyllithium is preferred. The initiator can be used in the polymerization mixture (including monomers and solvent) in an amount calculated on the basis of one initiator molecule per desired polymer chain. The lithium initiator process is well known and is described in, for example, U.S. Pat. Nos. 4,039,593 and Re. 27,145, which descriptions are incorporated herein by reference.

Polymerization conditions to prepare the block copolymers of the present invention are typically similar to those used for anionic polymerizations in general. In the present invention polymerization is preferably carried out at a temperature of from about −30° C. to about 150° C., more preferably about 10° C. to about 100° C., and most preferably, in view of industrial limitations, from about 30° C. to about 90° C. The polymerization is carried out in an inert atmosphere, preferably nitrogen, and may also be accomplished under pressure within the range of from about 0.5 to about 10 bars. This polymerization generally requires less than about 12 hours, and can be accomplished in from about 5 minutes to about 5 hours, depending upon the temperature, the concentration of the monomer components, and the molecular weight of the polymer that is desired.

Preparation of the $(A-C)_nX$ polymers requires a post-polymerization step called "coupling". In the above formula n is an integer of from 2 to about 4, and X is the remnant or residue of a coupling agent. A variety of coupling agents are known in the art and can be used in preparing the coupled block copolymers of the present invention. These include, for example, dihaloalkanes, silicon halides, siloxanes, multifunctional epoxides, silica compounds, esters of monohydric alcohols with carboxylic acids, (e.g. methylbenzoate and dimethyl adipate) and epoxidized oils. Star-shaped polymers are prepared with polyalkenyl coupling agents as disclosed in, for example, U.S. Pat. Nos. 3,985,830; 4,391,949; and 4,444,953; as well as Canadian Patent No. 716,645, each incorporated herein by reference. Suitable polyalkenyl coupling agents include divinylbenzene, and preferably m-divinylbenzene. Preferred are tetra-alkoxysilanes such as tetra-methoxysilane (TMOS) and tetra-ethoxysilane (TEOS), tri-alkoxysilanes such as methyltrimethoxysilane (MTMS), aliphatic diesters such as dimethyl adipate and diethyl adipate, and diglycidyl aromatic epoxy compounds such as diglycidyl ethers deriving from the reaction of bis-phenol A and epichlorohydrin.

It is also important to control the molecular weight of the various blocks. The A mono alkenyl arene blocks have number average molecular weights of 25,000 to about 35,000. The B block has number average molecular weights of about 100,000 to about 150,000 and 50,000 to about 75,000 for the conjugated diene C block. As used herein, the term "molecular weight" refers to the true molecular weight in g/mol of the polymer or block of the copolymer. The molecular weights referred to in this specification and claims can be measured with gel permeation chromatography (GPC) using polystyrene calibration standards, such as is done according to ASTM 3536. GPC is a well-known method wherein polymers are separated according to molecular size, the largest molecule eluting first. The chromatograph is calibrated using commercially available polystyrene molecular weight standards. The molecular weight of polymers measured using GPC so calibrated are styrene equivalent molecular weights. The styrene equivalent molecular weight may be converted to true molecular weight when the styrene content of the polymer and the vinyl content of the diene segments are known. The detector used is preferably a combination ultraviolet and refractive index detector. The molecular weights expressed herein are measured at the peak of the GPC trace, and are converted to true molecular weights.

Another important aspect of the present invention is to control the microstructure or vinyl content of the conjugated diene in the C block and the B block. The term "vinyl content" refers to the fact that a conjugated diene is polymerized via 1,2-addition (in the case of butadiene—it would be 3,4-addition in the case of isoprene). Although a pure "vinyl" group is formed only in the case of 1,2-addition polymerization of 1,3-butadiene, the effects of 3,4-addition polymerization of isoprene (and similar addition for other conjugated dienes) on the final properties of the block copolymer will be similar. The term "vinyl" refers to the presence of a pendant vinyl group on the polymer chain. When referring to the use of butadiene as the conjugated diene in the B or C block, it is preferred that about 30 to about 70 mol percent of the condensed butadiene units in the copolymer block have 1,2 vinyl configuration as determined by proton NMR analysis, preferably about 40 to about 60 mol percent of the condensed butadiene units should have 1,2-vinyl configuration. Suitable ratios of distribution agent to lithium are disclosed and taught in U.S. Pat. No. Re 27,145, which disclosure is incorporated by reference.

The block copolymer is selectively hydrogenated. Hydrogenation can be carried out via any of the several hydrogenation or selective hydrogenation processes known in the prior art. For example, such hydrogenation has been accomplished using methods such as those taught in, for example, U.S. Pat. Nos. 3,494,942; 3,634,549; 3,670,054; 3,700,633; and Re. 27,145. Hydrogenation can be carried out under such conditions that at least about 90 percent of the conjugated diene double bonds have been reduced, and between zero and 10 percent of the arene double bonds have been reduced. Preferred ranges are at least about 95 percent of the conjugated diene double bonds reduced, and more preferably about 98 percent of the conjugated diene double bonds are reduced.

The benzoate ester component is a high melting point ester of benzoic acid having a melting point between about 700° C. and about 170° C. Broadly, the group of esters include benzoic acid esters such as glyceryl tribenzoate, neopentyl dibenzoate, triethylene glycol dibenzoate, trimethylolethane tribenzoate, 1,4-cyclohexane dimethanol dibenzoate or mixtures thereof. Preferably the benzoate ester is 1,4-cyclohexane dimethanol dibenzoate. This may be obtained from Velsicol Chemical Company as Benzoflex® 352.

The selectively hydrogenated block copolymer and the benzoate ester component are first blended and melt mixed together. The amount of block copolymer used is 5 to 50 parts by weight, preferably 10 to 20 parts by weight. The amount of benzoate ester used is 95 to 50 parts by weight, preferably 70 to 90 parts by weight. The total of the mixture is 100 parts by weight.

It will be appreciated that the size of the block copolymer/ester particles is very important. Small particles are necessary for obtaining a stable dispersion in the plasticizer. Moreover, if the block copolymer/ester particles are too large, it is not possible to transfer the dispersion of block copolymer/ester particles in the rubber compatible plasticizer into a homogeneous product. In general, a particle size of 800 micron or less will suffice, whereas a particle size of 200 micron or less is preferred. A particle size of 100 micron or less is most preferred. Accordingly, the mixture is turned into particles having a particle size of less than about 800 microns. In order to obtain the block copolymer/ester in a powdered form in which the individual particles all have about the same, small size, any of the presently known techniques may be applied. Examples of such techniques are dispersing under high shear and subsequent precipitation, precipitation of a true solution into a non-solvent under high-speed mixing, cryogenic milling and spray drying. Cryogenic milling and spray drying are preferred, with cryogenic milling being most preferred.

After the block copolymer/benzoate ester mixture is turned into the proper size, the particles are mixed with an oil and optional tackifying resin to form a dispersion. The mixtures comprise between 15 and 50 weight percent of the block copolymer/benozoate ester mixture, between zero to 30 weight percent oil and between 85 and 30% resin.

Extending oils used to make articles of the present invention preferably are hydrocarbon oils. Preferred extending oils are the white mineral oils such as the DRAKEOL® oils sold by Penreco, Karns City, Pa., and the TUFFLO® oils sold by Citgo, Tulsa, Okla. Low aromatic content paraffinic/naphthenic process oils are also satisfactory, such as the SHELLFLEX® oils sold by Shell, Houston, Tex., and the CALSOL® oils sold by Calumet. Synthetic oils such as the poly-alpha-olefin oils, polypropylene oils, polybutene oils and the like are also suitable. Any extending oil that is compatible with the block copolymers of the present invention, liquid at ambient temperatures, and known to be useful to those of ordinary skill in the art of preparing the subject article can be used with the present invention.

Tackifying resins include both polystyrene block compatible resins and mid block compatible resins. The polystyrene block compatible resin may be selected from the group consisting of coumarone-indene resin, polyindene resin, poly (methyl indene) resin, polystyrene resin, vinyltoluene-alpha-methylstyrene resin, alphamethylstyrene resin and polyphenylene ether, in particular poly(2,6-dimethyl-1,4-phenylene ether). Such resins are e.g. sold under the trademarks "HERCURES", "ENDEX", "KRISTALEX", "NEVCHEM" and "PICCOTEX". Resins compatible with the hydrogenated (mid) block may be selected from the group consisting of compatible $C_5$ hydrocarbon resins, hydrogenated $C_5$ hydrocarbon resins, styrenated $C_5$ resins, $C_5/C_9$ resins, styrenated terpene resins, fully hydrogenated or partially hydrogenated C9 hydrocarbon resins, rosins esters, rosin derivatives and mixtures thereof. These resins are e.g. sold under the trademarks "REGALITE", "REGALREZ", "ESCOREZ", "WINGTACK" and "ARKON". Particularly preferred are resins which are liquid at room temperature.

The dispersion will then be applied to the part or the surface to be modified with the elastosol. The dispersion is then heated to a temperature higher than the melting point of the ester to form a hot fluid mixture. Then the fluid mixture is cooled to form a solid elastic composition.

Solid Rubbery Gels

In another aspect, the present invention is a method of forming a solid gel comprising the steps of:

(a) mixing about 5 to about 20 parts by weight of a block copolymer with 95 to 80 parts by weight of an ester compound at elevated temperature to form a hot fluid blend, wherein said block copolymer is a solid selectively hydrogenated block copolymer having the general configuration A-B-A, $(A-C)_n X$ or mixtures thereof, where n is an integer from 2 to about 4, and X is coupling agent residue, and wherein:
 (i) prior to hydrogenation each A block is a mono alkenyl arene polymer block and each B block and C block is a conjugated diene block having a vinyl content between 30 weight percent and 50 weight percent;
 (ii) subsequent to hydrogenation about 0-10% of the arene double bonds have been reduced, and at least about 90% of the conjugated diene double bonds have been reduced;

(iii) each A block having a number average molecular weight between about 25,000 and about 45,000; each B block having a number average molecular weight between about 100,000 and about 200,000; and each C block having a number average molecular weight between about 50,000 and about 100,000;

(iv) the total amount of mono alkenyl arene in the hydrogenated block copolymer is about 30 percent weight to about 35 percent weight;

(b) cooling said hot fluid blend to room temperature to form a cooled masterbatch; and (c) mixing said cooled masterbatch with an extending oil in a ratio of masterbatch to oil of 60:40 to 40:60, therein forming a solid, rubbery gel.

In the first step about 5 to about 20 parts by weight of a selectively hydrogenated block copolymer is mixed with about 95 to 80 parts by weight of an ester compound at elevated temperature to form a hot fluid blend. Preferably the amount of block copolymer is about 10 to 15 parts by weight block copolymer and 85 to 90 parts by weight of the ester compound. The total weight of the mixture is 100 parts by weight.

The block copolymer used for solid rubbery gels is similar to the block copolymer used for elastosols, except that the molecular weights of the A, B and C blocks are are 25,000 to 45,000 for the A blocks, 100,000 to 200,000 for the B blocks and 50,000 to 100,000 for the C blocks.

Any ester compound may be used in embodiments of the invention. An ester is defined as a compound that includes one or more carboxylate groups: R—COO—, where R is hydrogen, hydrocarbyl, phenyl, methoxyphenyl, alkylphenyl, substituted alkyl, substituted phenyl, or other organic radicals. Suitable esters include monoesters, diesters, triesters, etc. Suitable esters are listed in U.S. Pat. No. 6,881,776, which disclosure is herein incorporated by reference. For example, one class of suitable esters that can be gelled is represented by the following formulas:

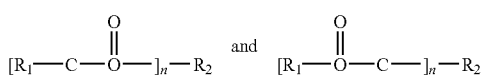

where n=1, 2, 3, and 4, and $R_1$ includes hydrogen, hydrocarbyl, phenyl, methoxyphenyl, alkylphenyl, substituted alkyl, and substituted phenyl; and $R_2$ includes hydrogen, hydrocarbyl, phenyl, methoxyphenyl, alkylphenyl, substituted alkyl, substituted phenyl, alkylene, phenylene, substituted alkylene, substituted phenylene, etc. It is noted that a suitable group for $R_2$ depends on whether n is 1, 2, 3, or 4. Preferably, the ester compound is an ester which is a good solvent for the polystyrene block but a poor solvent for the rubber midblock. In this type of solvent, the rubber block is collapsed and is held in suspension by the soluble polystyrene blocks. A particularly preferred ester is bis-2-ethylhexyl sebacate (also known as DOS or dioctyl sebacate).

In the next step the hot fluid blend is cooled to room temperature to form a cooled masterbatch. Then the cooled masterbatch is mixed with an extending oil in a ratio of masterbatch to oil of 60:40 to 40:60, therein forming a solid, rubbery gel. The extending oil includes the oils described for elastosols.

The solid rubbery gels of the present invention are useful in a variety of applications, such as filling compounds for waterproofing copper cable and air fresheners. The solid rubbery gels have advantages over the prior art in that they can be prepared at ambient temperature, thereby simplifying the process for making and applying them.

UV Curable Gels

In yet another aspect, the present invention is a thermoplastic gel composition that may be crosslinked by exposure to radiation comprising:

(a) mixing from 5 to 20 weight percent of an unhydrogenated crosslinkable block copolymer with 95 to 80 weight percent of an ester compound at elevated temperature to form a hot fluid blend, wherein said block copolymer has the structure A-B-A or $(A-C)_nX$ and (A-C) where n is an integer from 2 to 4, X is coupling agent residue, and the weight ratio of $(A-C)_nX$ to (A-C) is between 75:25 and 90:10, and wherein:

(i) each A block is a mono alkenyl arene polymer block and each C block and B block is a conjugated diene block having a vinyl content between 10 weight percent and 70 weight percent;

(ii) each A block having a number average molecular weight between about 15,000 and about 25,000; each C block having a number average molecular weight between about 40,000 and about 80,000; and each B block having a number average molecular weight between about 80,000 and 160,000;

(iii) the total amount of mono alkenyl arene in the unhydrogenated block copolymer is about 30 percent weight to about 35 percent weight;

(b) cooling said hot fluid blend to room temperature to form a cooled masterbatch;

(c) mixing said cooled masterbatch with from 50 to 90 weight percent of a liquid component selected from the group consisting of extending oils, resins and solvents which are compatible with the crosslinkable block copolymer; from 0 to 20 weight percent of at least one crosslinker selected from the group consisting of difunctional or multifunctional acrylate or methacrylate monomers and vinyl ethers; optionally from 0 to 5 weight percent expandable microspheres and/or chemical blowing agent; and from 0.1 to 3 weight percent of a photoinitiator wherein the total of all components equals 100 weight percent; and (d) exposing said blend to UV radiation to crosslink the block copolymer.

The block copolymer used for UV curable gels is different from the block copolymer used in elastosols and in solid rubber gels. The block copolymer is an unhydrogenated block copolymer of the structure A-B-A or $(A-C)_nX$ and (A-C) where n is an integer from 2 to 4, X is coupling agent residue, and the weight ratio of $(A-C)_nX$ to (A-C) is between 75:25 and 90:10. Otherwise the manufacture of the block copolymer will be similar to that described above except that there is no hydrogenation step but there is a coupling step, and that the coupling efficiency is between 75 and 90 weight percent, such that there is a certain amount of diblock present. The A blocks will have a number average molecular weight between about 15,000 and about 25,000; the C blocks will have a number average molecular weight between about 40,000 and about 80,000 and the B blocks will have a number average molecular weight between about 80,000 and about 160,000. The vinyl content of the diene will be between 10 and 70 percent, preferably between 10 and 50 weight percent, based on the diene portion of the block copolymer.

The thermoplastic gel composition comprises from about 50 to about 90 weight percent of a component selected from the group consisting of extending oils, resins and solvents. The selection of which of these extending oils, resins and solvents to use is a function of the end use intended for the composition. For example, when the end use is a candle, an extending oil would be used. If the end use is an adhesive or gasket, a resin is often used. If the end use is an air freshener, a volatile solvent and a fragrance would be used.

Extending oils used to make articles of the present invention preferably are hydrocarbon oils as described above. Many naturally occurring fats and oils are also suitable. A wide variety of resins can be used to make articles of the present invention. They can be derived from natural sources such as rosins and terpenes or from petroleum sources such as C5 and/or C9 streams and they may optionally be hydrogenated. Particularly preferred resins are those which are liquid at room temperature, such as Wingtack 10 solid by Sartomer, Adtack B10 and Regalrez 1018 sold by Eastman, and Hercolyn D sold by Hercules.

Solvents can also be used to prepare articles of the present invention. The selection of solvent will also vary according to the end use of the article. The solvent can function as a plasticizer, but preferably it is a volatile compound that slowly emerges from the gel and performs a function such as masking unpleasant odors or killing or repelling insects. Solvents useful with the present invention can also be volatile hydrocarbon solvents or oxygenated solvents such as esters, ethers or alcohols which evaporate slowly and aid in the release of a functional additive such as an insect repellant or a perfume. Any solvent that is compatible with the block copolymers of the present invention, liquid at ambient temperatures, and known to be useful to those of ordinary skill in the art of preparing the subject article can be used with the present invention.

As noted above, the extending oils, resins and solvents will be present in the gel composition of the present invention in an amount from about 30 to about 90 weight percent, preferably from about 40 to about 60weight percent.

The compositions of the present invention also include from about 0 to about 20 weight percent, preferably 5 to 15 weight percent, of at least one crosslinker selected from the group consisting of difunctional or multifunctional acrylate or methacrylate monomers such as those supplied by Sartomer, Exton, Pa., and vinyl ethers such as those supplied by BASF, Mount Olive, N.J. Particularly preferred crosslinkers for use with the present invention are hexane diol diacrylate and hexane diol dimethacrylate.

In those instances where it is desired to prepare gels of lower density, additional components of the present invention that can be added to achieve this end include expandable microspheres, such as the EXPANCEL® expandable microspheres available from Akzo Nobel and chemical blowing agents, such as Celogen 754A from Chemtura. When added, these expandable microspheres and blowing agent are preferably present in the thermoplastic gel composition in an amount from about 0.1 to about 5 weight percent, preferably in an amount from about 1 to about 5 weight percent. The expandable microspheres generally consist of a polymer shell encapsulating a gas or vaporizable liquid. When the expandable microspheres are heated, the gas inside the shell increases its pressure and the thermoplastic shell softens, resulting in a dramatic increase in the volume of the microspheres. When fully expanded, the volume of the microspheres may increase more than 40 times their original volume. Prior to expansion, the density of such polymeric microspheres may range from 1.0 to 1.3 gm/cc. The expansion temperature of such polymeric microspheres may range from about 60° C. to about 200° C. The density of the expandable microspheres drops to about 0.05 gm/cc after expansion. To prevent these expanded, low density microspheres from merely separating to the top during expansion, it is required that the gel have enough integrity to prevent this separation. By crosslinking the gel with the polymers and crosslinkers of the present invention, separation of the expanding microspheres is inhibited.

If the thermoplastic compositions of the present invention are to be converted to thermoset compositions by exposure to ultraviolet light, then it is necessary to include a photoinitiator in the formulation at a concentration of from 0.1 to 3.0 weight percent. Useful photoinitiators include:

benzoin ethers, such as benzoin methyl ether and benzoin isopropyl ether;
substituted acetophenones and benzophenones such as diethoxyacetophenone and DAROCURE™ BP sold by Ciba, Tarrytown, N.Y.;
benzyldimethyl ketal such as IRGACURE® 651 sold by Ciba;
alpha hydroxyketones such as IRGACURE® 184 sold by Ciba; and
bis acyl phosphine oxides such as IRGACURE® 819 sold by Ciba.

The bis acyl phosphine oxide type photoinitiators are particularly preferred for crosslinking compositions of the present invention by exposure to ultraviolet light.

The thermoplastic compositions of this invention may be cured by exposure to a wide variety of electromagnetic radiation sources. Either ionizing radiation such as alpha, beta, gamma, X-rays and high energy electrons or non-ionizing radiation such as ultraviolet, visible, infrared, microwave and radio frequency may be used. Electron beam, ultraviolet and visible radiation sources are preferred.

Electron beam equipment may be of the high voltage type in which a focused, high energy beam of electrons is scanned across the composition to be cured or of the low energy type in which a curtain of electrons passes through a window of a linear cathode electron beam tube and the composition is passed beneath the curtain. Manufacturers of high voltage electron-accelerator equipment are High Voltage Engineering Corporation, Burlington, Mass. And Radiation Dynamics, Inc., Westbury, N.Y. Manufacturers of low energy electron beam generating equipment include American International Technologies, Inc., of Torrance, Calif.; RPC Industries of Hayward, Calif.; and Energy Sciences of Wilmington, Mass.

Sources of ultraviolet light may also be of the high intensity type using lamps in the 200 to 300 watt/inch range or of the low intensity type using lamps in the 5 to 20 watt/inch range. Adischarge is placed across the lamps, either through electrodes on either ends of the tubes or by microwave irradiation, generating a plasma within the lamp. The material inside the lamp determines the wavelength of emission from the lamp and the type of lamp can be chosen so the radiation emitted from the lamp matches the absorption characteristics of the photoinitiator. High intensity ultraviolet equipment is available from, for example, Fusion Systems Inc., Gaithersburg, Md. Low intensity ultraviolet equipment is available from, for example, Ultra-Violet Products, Los Angeles, Calif.

Radiation in the visible region can also be obtained from the same type of equipment used to generate ultraviolet radiation simply by using lamps which contain the appropriate material. Fluorescent lamps, tungsten halide lamps and visible lasers may also be utilized.

The compositions of the present invention can additionally have up to 20 weight percent of one or more supplemental components selected from the group consisting of stabilizers, pigments, dyes and fragrances. Any additive known to be useful to those of ordinary skill in the art of preparing articles using gels can be used with the present invention.

The components of the thermoplastic compositions of the present invention can be combined and mixed to form the compositions in anyway known to be useful to those of ordinary skill in the art of forming thermoplastic gels. Generally, the polymer and ester components are admixed at a temperature which is high enough to allow easy mixing and for a period of time long enough to form a homogeneous composition and then the composition is cooled to room temperature forming the masterbatch. This masterbatch can be mixed with the remaining ingredients at near ambient temperature.

The compositions of the present invention can be fabricated into articles by any process known to be useful to those of ordinary skill in the art of preparing such articles. Such processes include, but are not limited to molding, pouring, extruding, and the like.

While not wishing to be bound to any theory, it is never the less believed that the crosslinking of the polymer by the crosslinking agent serves to convert the thermoplastic compositions to thermoset compositions. Once converted, the thermoset compositions of the present invention can be used at comparatively high temperatures without deforming or running, making these compositions desirable for the claimed applications as well as other gel applications where these properties would be advantageous.

The UV cured gels of the present invention have advantages over the prior art, in that they can be prepared at ambient temperature, thereby simplifying the process for making the gels. This also allows expandable microspheres, blowing agents and fragrances to easily be incorporated.

Chemically Cured Gels

In still another aspect, the present invention is a process for making a thermoplastic gel composition that may be chemically crosslinked comprising:

(a) mixing about 5 to about 20 parts by weight of a maleated block copolymer with 95 to 80 parts by weight of an ester at elevated temperature to form a hot fluid blend, wherein said block copolymer is a maleated, selectively hydrogenated block copolymer having the general configuration A-B-A, $(A-C)_n X$ or mixtures thereof, where n is an integer from 2 to about 4, and X is coupling agent residue, and wherein:

(i) prior to hydrogenation each A block is a mono alkenyl arene polymer block and each B and C block is a conjugated diene block having a vinyl content between 30 weight percent and 70 weight percent;

(ii) subsequent to hydrogenation about 0-10% of the arene double bonds have been reduced, and at least about 90% of the conjugated diene double bonds have been reduced;

(iii) each A block having a number average molecular weight between about 25,000 and about 45,000; each B block having a number average molecular weight between about 100,000 and about 200,000; and each C block having a number average molecular weight between about 50,000 and about 100,000;

(iv) the block copolymer after hydrogenation having been grafted with an acid compound selected from the group consisting of maleic anhydride, maleic acid, fumaric acid, and their derivatives; and (v) the total amount of mono alkenyl arene in the hydrogenated block copolymer is about 25 percent weight to about 35 percent weight;

(b) mixing between 50 and 80 parts by weight of the blend of step (a) with 0.1 to 5 parts by weight of a chemical crosslinking agent capable of reacting with the acid/anhydride functional groups, 50 to 20 parts by weight of a liquid component selected from the group consisting of extending oils, resins and solvents which are compatible with the maleated block copolymer, zero to 10 parts by weight of a chemical foaming agent and zero to 10 parts by weight of expandable microspheres; and (c) chemically curing the mixture of step (b) to form a solid, rubbery gel.

The key to making improved chemically cured gels is the use of the maleated block copolymer. The base block copolymer is the same or similar to that used to make the solid gel. The base polymer is then reacted with an acid compound selected from the group consisting of maleic anhydride, maleic acid, fumaric acid, and their derivatives. The level of maleation is between 0.2 and 5 percent by weight, based on the total weight of the polymer, preferably between about 0.5 and 2 weight percent.

In the first step, about 5 to about 20 parts by weight of the maleated block copolymer is mixed with 95 to 80 parts by weight of an ester at elevated temperature to form a hot fluid blend. Preferred amounts are 10 to 15 parts by weight maleated block copolymer and 90 to 85 parts by weight of the ester. The ester used for chemically cured gels is similar to the ester used in solid rubbery gels above.

In the next step, about 50 and 80 parts by weight of the maleated block copolymer/ester blend is mixed with 0.1 to 5 parts by weight of a chemical crosslinking agent capable of reacting with the acid/anhydride functional groups, 50 to 20 parts by weight of a liquid component selected from the group consisting of extending oils, resins and solvents which are compatible with the maleated block copolymer, zero to 10 parts by weight of a chemical foaming agent and zero to 10 parts by weight of expandable microspheres. The resulting mixture is then chemically cured to form the solid gel.

The advantage of the present chemically cured gels is that they can be prepared at ambient temperature, thereby simplifying the process for making the gels. This also allows temperature sensitive components such as fragrances, expandable microspheres or blowing agents to easily be incorporated.

EXAMPLES

The following examples are provided to illustrate the present invention. The examples are not intended to limit the scope of the present invention and they should not be so interpreted. Amounts are in weight parts or weight percentages unless otherwise indicated.

Three polymers are used to demonstrate the invention. KRATON® G 1651, supplied by Kraton Polymers is an S-EB-S block copolymer meeting all the characteristics required for the block copolymers used for elastosols and for solid rubbery gels. KRATON® D 1184 is a coupled styrene/butadiene block copolymer meeting all the characteristics required for the unhydrogenated block copolymer used for UV curable gels. KRATON® MD 6684 is a maleated block copolymer used for chemically cured gels, meeting all the characteristics required for the maleated block copolymer. The maleation level for MD 6684 is about 1 weight percent.

The other ingredients used in the examples are identified as follows:

| INGREDIENT | SUPPLIER | DESCRIPTION |
|---|---|---|
| Drakeol 7 | Penreco | White mineral oil, 11 centistokes @ 40° C. |
| Irganox 1010 | Ciba | Hindered phenol type antioxidant |

-continued

| INGREDIENT | SUPPLIER | DESCRIPTION |
|---|---|---|
| Irgacure 819 | Ciba | Bis Acyl Phospine Oxide type photoinitiator |
| SR238 | Sartomer | Hexanediol diacrylate crosslinker |
| Expancel DU091/80 | Akzo Nobel | Expandable microspheres |
| Celogen 754A | Chemtura | Azodicarbonamide blowing agent |
| Benzoflex 352 | Velsicol | 1,4-cyclohecane dimethanol dibenzoate |
| DOS | Aldrich | Diocytl sebacate |
| Regalrez 1018 | Eastman | Liquid hydrogenated $C_9$ resin |
| AlAcAc | Aldrich | Aluminum acetylacetonate |

EXAMPLES

Example 1

Elastosols

In this example, various elastosols were made. The first step was to blend the following components in a Silverson rotor-stator mixer (Silverson Machines, Inc., East Longmeadow, Mass.) for about 1 hour at 150° C. at about 2000 rpm. Then the blend was turned into 35 mesh powder by cryogenic grinding in a hammer mill cooled with liquid nitrogen.

| Composition, % w | MB-1-A |
|---|---|
| Benzoflex 352 | 84.9 |
| Kraton G1651 | 15 |
| Irganox 1010 | 0.1 |

In the next step, the powder (MB-1-A) was blended as shown in the following table.

|  | 1-1 | 1-2 | 1-3 |
|---|---|---|---|
| Composition, % w |  |  |  |
| MB-1-A | 20 | 30 | 40 |
| Regalrez 1018 | 80 | 70 | 60 |
| Blend Composition, % w |  |  |  |
| Kraton G1651 | 3 | 4.5 | 6 |
| Benzoflex 352 | 17 | 25.5 | 34 |
| Regalrez 1018 | 80 | 70 | 60 |

In stirring in the powder, it was apparent that the composition was very thick and hard to stir, so Drakeol 7 was added, as shown in the following table.

|  | 1-4 | 1-5 | 1-6 |
|---|---|---|---|
| Composition, gm |  |  |  |
| MB-1-A | 6 | 9 | 12 |
| Regalrez 1018 | 24 | 21 | 18 |
| Drakeol 7 | 6 | 6 | 6 |
| Blend Composition, % w |  |  |  |
| Kraton G1651 | 2.5 | 3.8 | 5.0 |
| Benzoflex 352 | 14.2 | 21.3 | 28.3 |
| Regalrez 1018 | 66.7 | 58.3 | 50.0 |
| Drakeol 7 | 16.7 | 16.7 | 16.7 |
| Appearance | relatively thin, separated overnight | relatively thin, separated overnight | looked nice, still nice after 5 months at room temperature |

As shown above, Sample 1-6 was the preferred composition because the mixture remained stable with no phase separation upon extended storage at room temperature.

Sample 1-6 paste was placed in a release paper mold and baked 30 minutes at 150° C. to fuse. After cooling to room temperature, the composition was an opaque, tacky, coherent, elastic film.

Example 2

Solid Rubbery Gels

The following formulations were prepared by mixing with a Silverson mixer at 130° C. for about 60 minutes at about 2000 rpm.

| Composition, % w | MB-2-A[a)] | MB-2-B[b)] |
|---|---|---|
| Bis-2-ethylhexyl sebacate (DOS) | 89.9 | 84.9 |
| Kraton G1651 | 10.0 | 15.0 |
| Irganox 1010 | 0.1 | 0.1 |

The blends shown in the following two tables were then made with a spatula at room temperature. Softening points were measured about 3 weeks after the samples were mixed.

|  | 2-1 | 2-2 | 2-3 | 2-4 | 2-5 |
|---|---|---|---|---|---|
| Composition, % w |  |  |  |  |  |
| Blend MB-2-A | 70 | 60 | 50 | 40 | 30 |
| Drakeol 7 | 30 | 40 | 50 | 60 | 70 |
| Blend Composition, % w |  |  |  |  |  |
| Kraton G1651 | 7 | 6 | 5 | 4 | 3 |
| DOS | 63 | 54 | 45 | 36 | 27 |
| Drakeol 7 | 30 | 40 | 50 | 60 | 70 |
| R&B Softening Point, ° F. | <80 | 95 | 120 | 130 | c) |
| R&B Softening Point, ° C. |  | 35 | 49 | 54 |  |
| Appearance | rubbery, hazy, very slight oil bleed | nice, clear, rubbery, very soft, tacky | nice, clear, rubbery, very soft, tacky | nice, clear, rubbery, very soft, slightly tacky | sloppy, hazy, free oil |

|  | 2-6 | 2-7 | 2-8 | 2-9 | 2-10 | 2-11 |
|---|---|---|---|---|---|---|
| Composition, % w |  |  |  |  |  |  |
| Blend MB-2-B | 70 | 60 | 50 | 40 | 30 | 20 |
| Drakeol 7 | 30 | 40 | 50 | 60 | 70 | 80 |
| Blend |  |  |  |  |  |  |

-continued

| Composition, % w | | | | | | |
|---|---|---|---|---|---|---|
| Kraton G1651 | 10.5 | 9 | 7.5 | 6 | 4.5 | 3 |
| DOS | 59.5 | 51 | 42.5 | 34 | 25.5 | 17 |
| Drakeol 7 | 30 | 40 | 50 | 60 | 70 | 80 |
| R&B Softening Point, ° F. | 108 | 120 | 128 | 138 | 135 | c) |
| R&B Softening Point, ° C. | 42 | 49 | 53 | 59 | 57 | |
| Appearance | hazy, rubbery, tacky | clear, rubbery, tacky | clear, rubbery, slightly tacky | clear, rubbery, slightly tacky | sloppy, hazy, free oil | chunky, lots of free oil | a) Blend MB-2-A is low viscosity, bluish, slightly hazy, stable dispersion.
b) Blend MB-2-B is moderate viscosity, hazy, stable dispersion.
c) Sample would not support the ball at RT.

When initially mixed, blends 2-1 through 2-11 were hazy. However, after standing overnight at room temperature, blends having a suitable proportion of masterbatch to oil fused to become nice, clear, rubbery gels. Examples of gels of suitable compositions are 2-3, 2-4, 2-5, 2-7, 2-8 and 2-9.

Example 3

UV Curable Gels

In this example, a masterbatch of UV crosslinkable polymer in a suitable ester was made at high temperature. After cooling to room temperature, photoinitiator and crosslinker were mixed in to the masterbatch and then expandable microspheres and oil were mixed in. The blends were allowed to stand at room temperature overnight to fuse into soft rubbery thermoplastic gels. The gels were then cured by exposure to UV radiation. These thermoset gels were then baked at high temperature to expand the expandable microspheres to reduce the density of the gels.

| Composition, % w | MB-3-A | MB-3-B | 3-1 | 3-2 | 3-1* | 3-2* | MB-3-B* |
|---|---|---|---|---|---|---|---|
| Dioctyl sebacate (DOS) | 84.8 | | | | 59.36 | 59.36 | 83.96 |
| Kraton D1184 | 15.0 | | | | 10.50 | 10.50 | 14.85 |
| Irganox 1010 | 0.2 | | | | 0.14 | 0.14 | 0.20 |
| MB-3-A | | 99.01 | | | | | |
| Irgacure 819 | | 0.28 | | | 0.2 | 0.2 | 0.28 |
| Sartomer SR238 HDDA | | 0.71 | | | 0.5 | 0.5 | 0.71 |
| MB-3-B | | | 70 | 70 | | | |
| Expancel DU091/80 | | | | 3 | | 3 | |
| Drakeol 7 | | | 30 | 30 | 30 | 30 | |

(*refers to the formulation expressed as amounts of the individual components)

Blend MB-3-A was prepared by mixing with a Silverson rotor/stator mixer for about 60 minutes at 130° C. at about 2000 rpm. Blend MB-3-B was mixed with the SpeedMixer (FlackTek Inc., Landrum, S.C.) at 25° C. It mixed easily in about 5 minutes. Blends 3-1 and 3-2 were mixed manually at 250° C. Immediately after mixing, about 60 grams of 3-1 and 3-2 were poured into 4×4" molds and allowed to stand overnight to fuse into a gel about ¼" (6 mm) thick. These films were irradiated with two Fusion Systems "V" bulbs at 15 fpm (1560 mJ/cm2). Films were cut in half and one half irradiated with another pass under 2 "V" bulbs (1520 mJ/cm2).

| | 3-1 | 3-2 |
|---|---|---|
| Before Irradiation | | |
| Color | yellow | yellow |
| Clarity | hazy | hazy |
| Tack | gooey | gooey |
| After 1 pass under UV | | |
| Color | very slight yellow | slight yellow |
| Clarity | hazy | hazy |
| Tack | very tacky | very tacky |
| After 2 passes under UV | | |
| Color | very slight yellow | slight yellow |
| Clarity | hazy | hazy |
| Tack | less tack | less tack |
| After 2 passes under UV + 10 minutes @ 165° C. | | |
| Tack | very tacky | no tack |
| Feel | very very soft | soft, silky |
| Tear strength | very poor | very poor |
| Bleed in release paper | severe | v slight |
| Hardness, Shore A | too soft | 15 |
| Density before bake | 0.84 | 0.91 |
| Density after bake | 0.84 | 0.57 |
| Gel swollen in toluene | nice | nice |

As shown above, both samples were gooey before irradiation. After one pass irradiation they had much better integrity but they were still very tacky. After two pass irradiation, 3-1 without Expancel was a nice gel but it was very soft. Sample 3-2 after 2 passes and a bake was a very nice, silky feeling gel having a density of only 0.57 gm/cc. Thus, the Expancel could be mixed into the gel at room temperature, well below the temperature at which the microspheres begin to expand, and after UV curing, the gel had sufficient integrity to hold the low density microspheres in place in the gel.

Example 4

Chemically Cured Gels

This example is similar to Example 3 except the block copolymer is a maleated hydrogenated polymer instead of an unhydrogenated polymer and the polymer is crosslinked chemically instead of by exposure to UV radiation.

The following formulation was prepared by mixing with a Silverson rotor/stator mixer for about 60 minutes at about 160° C. at about 2000 rpm to give a masterbatch having moderate-high viscosity at room temperature.

| Composition, % w | MB-4-A |
|---|---|
| Kraton MD6684 | 15 |
| DOS | 84.9 |
| Irganox 1010 | 0.1 |
| Appearance | mod-high vis, thixotropic solution, self levels quickly, slight haze, pale yellow |

The following blends were then mixed with the Speedmixer at room temperature.

The best procedure was to mix everything except the masterbatch for about five minutes with the Speedmixer, then add the masterbatch and mix for another five minutes.

| Composition, % w | 4-1 | 4-2 | 4-3 |
|---|---|---|---|
| MB-4-A | 60 | 60 | 60 |
| AlAcAc | 0.3 | 0.3 | 0.3 |
| Expancel 91 DU 80 | | 3 | |
| Celogen 754A | | | 5 |
| Drakeol 7 | 40 | 40 | 40 |

| | 1 | 2 | 3 |
|---|---|---|---|
| Composition, % w | | | |
| Kraton MD6684 | 9.0 | 9.0 | 9.0 |
| AlAcAc | 0.3 | 0.3 | 0.3 |
| Expancel 91 DU 80 | | 3.0 | |
| Celogen 754A | | | 5.0 |
| DOS | 50.9 | 50.9 | 50.9 |
| Drakeol 7 | 40.0 | 40.0 | 40.0 |
| R&B Softening Point, ° F. | | | |
| 1 day at RT | >350 | Ball sank to ½ inch above the bottom plate and stopped | |
| 2 day at RT | >350 | Ball sank to ¾ inch above the bottom plate and stopped | |
| 3 day at RT | >350 | Slight drop of ball | |
| 4 day at RT | >350 | Slight drop of ball | |
| Hardness[a] | | | |
| Shore 00 | | 0 | 0 |
| Density, g/cc | | 0.50 | 0.40 |
| Appearance[b] | | Nice | nice but very soft |

[a] After standing 7 days at RT, samples were baked 15 minutes at 170° C.
[b] Cubes of foams soaked in toluene maintained their shapes, increased 50% in size.

As shown above, these gels were easily mixed at room temperature, well below the temperature at which the microspheres begin to expand or the blowing agent begins to decompose. After cure for 1 week at room temperature, the gels are thermoset, allowing the gels to maintain their integrity during the bake required to expand the microspheres or decompose the blowing agent. Thus, the gels have density in the 0.40 to 0.50 g/cc range.

What is claimed is:

1. A method for preparing an elastosol, comprising the steps of:
   (a) mixing 5 to 50 parts by weight of a block copolymer and 95 to 50 parts by weight of a benzoate ester having a melting point between about 70° C. and about 170° C. at a mixing temperature above the melting point of the ester, wherein said block copolymer is a solid selectively hydrogenated block copolymer having the general configuration A-B-A, (A-C)$_n$X or mixtures thereof, where n is an integer from 2 to about 4, and X is coupling agent residue, and wherein:
   (i) prior to hydrogenation each A block is a mono alkenyl arene polymer block and each B block and C block is a conjugated diene block having a vinyl content between 30 weight percent and 70 weight percent;
   (ii) subsequent to hydrogenation about 0-10% of the arene double bonds have been reduced, and at least about 90% of the conjugated diene double bonds have been reduced;
   (iii) each A block having a number average molecular weight between about 25,000 and about 35,000; each B block having a number average molecular weight between about 100,000 and about 150,000; and each C block having a number average molecular weight between about 50,000 and about 75,000; and
   (iv) the total amount of mono alkenyl arene in the hydrogenated block copolymer is about 30 percent weight to about 35 percent weight;
   (b) cooling the block copolymer/benzoate ester mixture below the melting point of the ester and turning it into a powder having a particle size of less than 800 micron;
   (c) mixing the block copolymer/benzoate ester powder with an oil and a tackifying resin at room temperature to form a dispersion wherein the percent weight of the block copolymer/benzoate ester powder mixture is between 15 and 50 wt. %, the weight percent of oil is between zero and 30 wt. %, and the weight percent of tackifying resin is between 85 and 30 wt. %;
   (d) heating the dispersion of the block copolymer/benzoate ester powder to a temperature higher than the melting point of the ester to form a hot fluid mixture; and
   (e) cooling the fluid mixture to form a solid elastic composition.

2. The method of claim 1, wherein the block copolymer/benzoate ester mixture is turned into a powder by cryogenic milling.

3. The method of 1, wherein the block copolymer/benzoate ester mixture is turned into a powder by spraying.

4. The method of claim 2, wherein said block copolymer is a selectively hydrogenated A-B-A polymer where the B block prior to hydrogenation is a 1,3-butadiene block having a vinyl content of between 35 and 45 weight percent.

5. The method according to claim 4, wherein said benzoate ester is 1,4-cyclohexane dimethanol dibenzoate.

6. The method of claim 5, wherein the heated dispersion of step (d) is applied to a substrate.

* * * * *